United States Patent
Mittal et al.

(10) Patent No.: US 11,514,382 B2
(45) Date of Patent: Nov. 29, 2022

(54) UTILIZING MICRO-SERVICES FOR OPTIMIZATION WORKFLOWS OF BOREHOLE OPERATIONS

(71) Applicant: Landmark Graphics Corporation, Houston, TX (US)

(72) Inventors: Manish Kumar Mittal, Cypress, TX (US); Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 25 days.

(21) Appl. No.: 17/117,910

(22) Filed: Dec. 10, 2020

(65) Prior Publication Data

US 2022/0188712 A1 Jun. 16, 2022

(51) Int. Cl.
*G06Q 10/06* (2012.01)
*G06Q 10/04* (2012.01)
(Continued)

(52) U.S. Cl.
CPC ......... *G06Q 10/0633* (2013.01); *E21B 47/12* (2013.01); *E21B 49/005* (2013.01); *E21B 49/087* (2013.01); *G06Q 10/04* (2013.01)

(58) Field of Classification Search
None
See application file for complete search history.

(56) References Cited

U.S. PATENT DOCUMENTS 9,229,603 B2   1/2016   Deimbacher et al.
9,388,680 B2   7/2016   Moran
(Continued)

FOREIGN PATENT DOCUMENTS

WO       2012106347 A1      8/2012
WO    WO-2016022337 A1 *    2/2016    ............. E21B 41/00
(Continued)

OTHER PUBLICATIONS

Ma, Tianshou, et al. "Wellbore stability analysis and well path optimization based on the breakout width model and Mogi-Coulomb criterion." Journal of Petroleum Science and Engineering 135 (2015): 678-701. (Year: 2015).*
(Continued)

*Primary Examiner* — Thomas L Mansfield
(74) *Attorney, Agent, or Firm* — Tenley Krueger; Parker Justiss, P.C.

(57) ABSTRACT

The disclosure presents processes and methods for utilizing one or more micro-services to generate a calibration of a factor of a borehole operation or to generate an optimization adjustment to the borehole operation. The micro-services selected for execution can be selected by an optimization workflow, where each type of borehole operation can have its own set of micro-services. The micro-services can be part of one or more computing systems, such as a downhole system, a surface system, a well site controller, a cloud service, a data center service, an edge computing system, other computing systems, or various combinations thereof. Also disclosed is a system for implementing micro-services on one or more computing systems to enable a light weight and fast response, e.g., real-time or near real-time response, to borehole operations.

21 Claims, 5 Drawing Sheets

(51) Int. Cl.
*E21B 47/12* (2012.01)
*E21B 49/00* (2006.01)
*E21B 49/08* (2006.01)

(56) References Cited

U.S. PATENT DOCUMENTS

| | | | |
|---|---|---|---|
| 9,638,830 B2 | 5/2017 | Meyer et al. | |
| 2011/0172923 A1* | 7/2011 | Van Os | E21B 45/00 73/152.01 |
| 2013/0049982 A1* | 2/2013 | Hartmann | E21B 47/00 340/854.1 |
| 2013/0311147 A1 | 11/2013 | Greenwood | |
| 2014/0121971 A1* | 5/2014 | Hanak | E21B 47/0228 702/6 |
| 2014/0163888 A1* | 6/2014 | Bowler | E21B 47/022 703/2 |
| 2015/0186570 A1* | 7/2015 | Huang | E21B 7/061 703/7 |
| 2015/0211352 A1* | 7/2015 | Sugiura | E21B 47/00 175/27 |
| 2017/0098020 A1* | 4/2017 | Samuel | G06F 30/20 |
| 2017/0342808 A1 | 11/2017 | Dykstra et al. | |
| 2018/0328164 A1 | 11/2018 | Gajic et al. | |
| 2019/0277130 A1 | 9/2019 | Zarate Losoya et al. | |

FOREIGN PATENT DOCUMENTS

| | | | | |
|---|---|---|---|---|
| WO | WO-2019162642 A1 * | 8/2019 | ........... | E21B 47/002 |
| WO | 2019178240 A1 | 9/2019 | | |

OTHER PUBLICATIONS

Ayodele, O. R. "Optimization of well placement and/or borehole trajectory for minimum drilling cost (a critical review of field case studies)." Canadian international petroleum conference. OnePetro, 2004. (Year: 2004).*

Al-Ajmi, Adel M., and Robert W. Zimmerman. "A new well path optimization model for increased mechanical borehole stability." Journal of Petroleum Science and Engineering 69.1-2 (2009): 53-62. (Year: 2009).*

Kaarstad, Eirik, and Bernt Sigve Aadnoy. "Optimization of borehole stability using 3-D stress optimization." SPE annual technical conference and exhibition. OnePetro, 2005. (Year: 2005).*

* cited by examiner

UTILIZING MICRO-SERVICES FOR OPTIMIZATION WORKFLOWS OF BOREHOLE OPERATIONS

TECHNICAL FIELD

This application is directed, in general, to improving borehole operation efficiency and, more specifically, utilizing workflow optimizations.

BACKGROUND

In developing a borehole, there can be many factors affecting borehole operations, such as friction, various decomposed factors related to friction, borehole cleaning, and other factors. Friction can affect the wear of equipment, alter the characteristics of the surrounding formation of the borehole while decreasing borehole operational efficiency. Borehole cleaning can affect friction as well as affecting the ability to trip out a drill string. It would be beneficial to be able to improve the accuracy of the various borehole factors and to be able to quickly process the factors in real-time or near real-time as the borehole operation approaches and passes through a portion of the borehole.

SUMMARY

In one aspect, a method is disclosed. In one embodiment the method includes (1) receiving initial data and input parameters, wherein at least a portion of the data is received from sensors and at least one sensor of the sensors is located downhole of a borehole, (2) processing the initial data through a first set of one or more micro-services utilizing the input parameters to generate processed data, and (3) generating one or more optimization factors utilizing the processed data for a borehole operation utilizing a second set of one or more micro-services, wherein the borehole operation is performed at least partially within the borehole.

In a second aspect, a micro-service system is disclosed. In one embodiment, the micro-service system includes (1) a data transceiver, capable of receiving input parameters and initial data from one or more of a downhole sensor, an uphole sensor, a surface sensor, a data store, previous survey data, a well site controller, or a computing system, wherein the downhole sensor, the uphole sensor, and the surface sensor collect measurements of a borehole or borehole system located in or proximate the borehole, (2) a result transceiver, capable of communicating one or more generated optimization factors to a borehole system, and (3) one or more micro-services, capable of utilizing the initial data and the input parameters to generate the one or more generated optimization factors.

In a third aspect, a computer program product having a series of operating instructions stored on a non-transitory computer-readable medium that directs a data processing apparatus when executed thereby to perform operations is disclosed. In one embodiment, the operations include (1) receiving initial data and input parameters, wherein at least a portion of the data is received from sensors and at least one sensor of the sensors is located downhole of a borehole, (2) processing the initial data through a first set of one or more micro-services utilizing the input parameters to generate processed data, and (3) generating one or more optimization factors utilizing the processed data for a borehole operation utilizing a second set of one or more micro-services, wherein the borehole operation is performed at least partially within the borehole.

BRIEF DESCRIPTION

Reference is now made to the following descriptions taken in conjunction with the accompanying drawings, in which.

DETAILED DESCRIPTION

When developing a borehole, one or more types of borehole operations can be employed, such as drilling, trip in, trip out, extraction, and other borehole operations that are performed at least partially within the borehole. Borehole operations can be affected by friction, accumulation of material in the borehole, the presence of cuttings, cuttings bed, and other borehole operation factors. These factors can affect the borehole operation across the borehole or a portion of the borehole. For example, a drilling fluid can accumulate cuttings and thereby increase the friction force against a rotating drill pipe, or the drill pipe can experience friction against a casing or subterranean formation, such as in a bend or dogleg portion of the borehole. The borehole can be developed for hydrocarbon production purposes, scientific purposes, or for other purposes that have operations occurring within a borehole.

Data can be collected from sensors downhole or at a surface location, where the data can be analyzed by one or more borehole operation systems. The data can be collected at a survey station, between survey stations, or at various points such as when a continuous survey operation is in use. The operation systems for receiving the collected data and performing an analyzation of the data can be monolithic systems, for example, a software product or a hardware product with multiple engineering modules packed into one accessible platform. These borehole operation systems can be deployed on site at the borehole. It would be beneficial to be able to access one or more modules of the borehole operation systems quickly, such as in real-time or near real-time, and with less processing overhead to enable faster output of results from the given inputs.

This disclosure presents processes and methods to improve the analysis of borehole factors and increase the accuracy of estimations of borehole factors, such as utilizing faster and more accurate calibration algorithms than are conventionally available. The processes and methods can determine the micro-services used for an optimization workflow utilizing existing or to be developed engineering models. In some aspects, an optimizer can be implemented to receive data from the micro-services to optimize the borehole operation being analyzed, such as adjusting the rotational speed of a drill string for a drilling operation, or adjusting a flow rate for a hole cleaning operation.

In some aspects, the micro-services can be deployed locally at the borehole site, such as part of a downhole tool, a surface tool, such as a well site controller, or a computing system. In some aspects, the micro-services can be deployed in a data center, cloud environment, or other distant computing system enabling the micro-service to be quickly updated with improvements, and allowing the micro-services to access various data stores to retrieve data while maintaining a real-time or near real-time processing analysis of the received data. In some aspects, some of the micro-services can be located proximate the borehole and some can be in a distant computing system. In some aspects, one or more of the micro-services can be deployed using an edge computing process.

The disclosed micro-services processes can enable greater flexibility in building differing optimization workflows, such as for different borehole operations. In some aspects, the optimization workflows can be performed on demand such that they can receive data from borehole sensors, such as downhole sensors, uphole sensors, or surface sensors, and then can proceed to analyze the data, with, optionally, using received data from a data store. The optimization workflows can proceed to communicate the micro-service output to a borehole operation optimizer to output real-time or near real-time adjustments to the borehole operation, for example, an adjustment to a rotational speed, a flow rate, a pressure, a speed of a longitudinal drill string movement, a fluid composition, and other types of adjustments. Therefore borehole operation efficiency can be improved.

The optimization workflow can be performed at set intervals, for example, at 40.0 foot intervals or at a survey station, to predict the conditions for the next interval to allow adjustments to be made to the borehole operation plan.

The micro-services can be encapsulated in software code or in hardware, for example, an application, code library, dynamic link library, module, function, script, RAM, ROM, and other software and hardware implementations. The software can be stored in a file, database, or other computing system storage mechanism. In some aspects, the micro-services can be partially implemented in software and partially in hardware.

Estimating borehole operation factors separately from other factors can improve the accuracy of the resulting combined factor, i.e., calculated factor. In some aspects, each separate, e.g., decomposed, factor can be analyzed independent of the other decomposed factors to determine which one or more decomposed factors are driving a deviation from a calibration function. Adjustments can be made to the borehole operations to reduce the one or more identified decomposed factors effect on the operations.

The optimized output of the micro-services can be communicated as inputs into systems to determine specific adjustments to the borehole operations and to improve estimations on wear and tear of downhole equipment. For example, the composition of drilling fluid can be adjusted, a pump out operation can be scheduled, rotational speed of the drill string can be adjusted, and other adjustments can be made. In some aspects, the system using micro-service output can be a downhole system, for example, a bottom hole assembly (BHA), a drilling system, a geo-steering system, and other downhole systems. In some aspects, the system using the micro-service output can be a surface or near surface system, such as a well site controller or a surface computing system. A user can be a borehole engineer, operator, or another type of user.

In some aspects, the processes and methods can be conducted in real-time or near real-time. In some aspects, the described processes and methods can be used to estimate the sustainability during the life of the borehole. In some aspects, the described processes and methods can be used in real-time or near real-time to adjust the drilling parameters or the borehole operation plan. In some aspects, the described processes and methods can be used to predict problems or issues prior to being encountered by the borehole operation.

Figure 1:
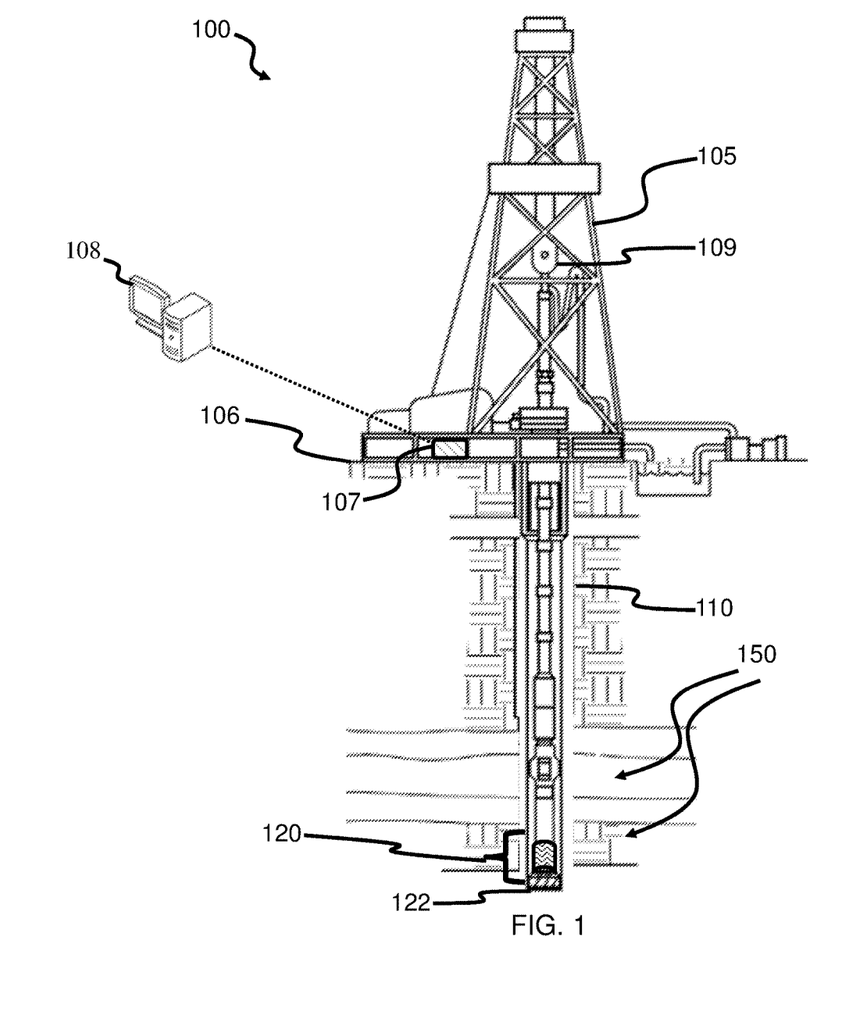
FIG. 1 is an illustration of a diagram of an example borehole system.

Turning now to the figures, FIG. 1 is an illustration of a diagram of an example borehole system 100 employing micro-services. Borehole system 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well or an intercept well. In some aspects, borehole system 100 can be for scientific or research purposes. Borehole system 100 includes a derrick 105, a well site controller 107, and a computing system 108. Well site controller 107 includes a processor and a memory and is configured to direct operation of borehole system 100. Derrick 105 is located at a surface 106.

Derrick 105 includes a traveling block 109 that includes a drill string hook. Traveling block 109 includes sensors to collect data on hook-load and torque experienced at traveling block 109. Extending below derrick 105 is a borehole 110 with downhole tools 120 at the end of a drill string. Downhole tools 120 can include various downhole tools and BHA, such as drilling bit 122. Other components of downhole tools 120 can be present, such as a local power supply (e.g., generators, batteries, or capacitors), telemetry systems, sensors, transceivers, and control systems. The sensors can be sensors that provide borehole data to other systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, and other information, including borehole data, the distance interval between calculations, weighting parameters, location within the borehole, a cuttings density, a cuttings load, a cuttings shape, a cuttings size, a deviation, a drill pipe rotation rate, a drill pipe size, a flow regime, a hole size, a mud density, a mud rheology, a mud velocity, a pipe eccentricity, subterranean formation mineralogy, and other input parameters.

Computing system 108 can be proximate well site controller 107 or be a distance away, such as in a cloud environment, a data center, a lab, or a corporate office location. Computing system 108 can be a laptop, a smartphone, a PDA, a server, a desktop computer, a cloud computing system, an edge computing system, other computing systems, or a combination thereof, that are operable to perform the processes and methods described herein. Well site operators, engineers, and other personnel can send and receive data, instructions, measurements, and other information by various conventional means with computing system 108 or well site controller 107.

In some aspects, one or more micro-service processors can be part of well site controller 107 or computing system 108. In some aspects, computing system 108 can be more than one computing system, such as a cloud environment and a local server, a downhole tool and a well site controller, or other combinations thereof. In some aspects, the micro-service processors can be partially located with well site controller 107, computing system 108, more than one computing system 108, or various combinations thereof.

The one or more micro-service processors can receive the various input parameters, such as from a data source, previous survey data, real-time or near real-time data received from sensors downhole or at a surface location, and perform the methods and processes disclosed herein, such as performing an optimization workflow. The results from the micro-services can be communicated to an optimizer, a friction factor processor, a drilling operations system, a geo-steering system, or other well site system or user where the results can be used as inputs to direct further borehole operations or can be used to identify adjustments to a borehole operation plan. In some aspects, computing system 108 can be located with downhole tools 120 and the computations can be completed at the downhole location. The results can be communicated to a drilling system or to a drilling operation system downhole or at a surface location.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2:
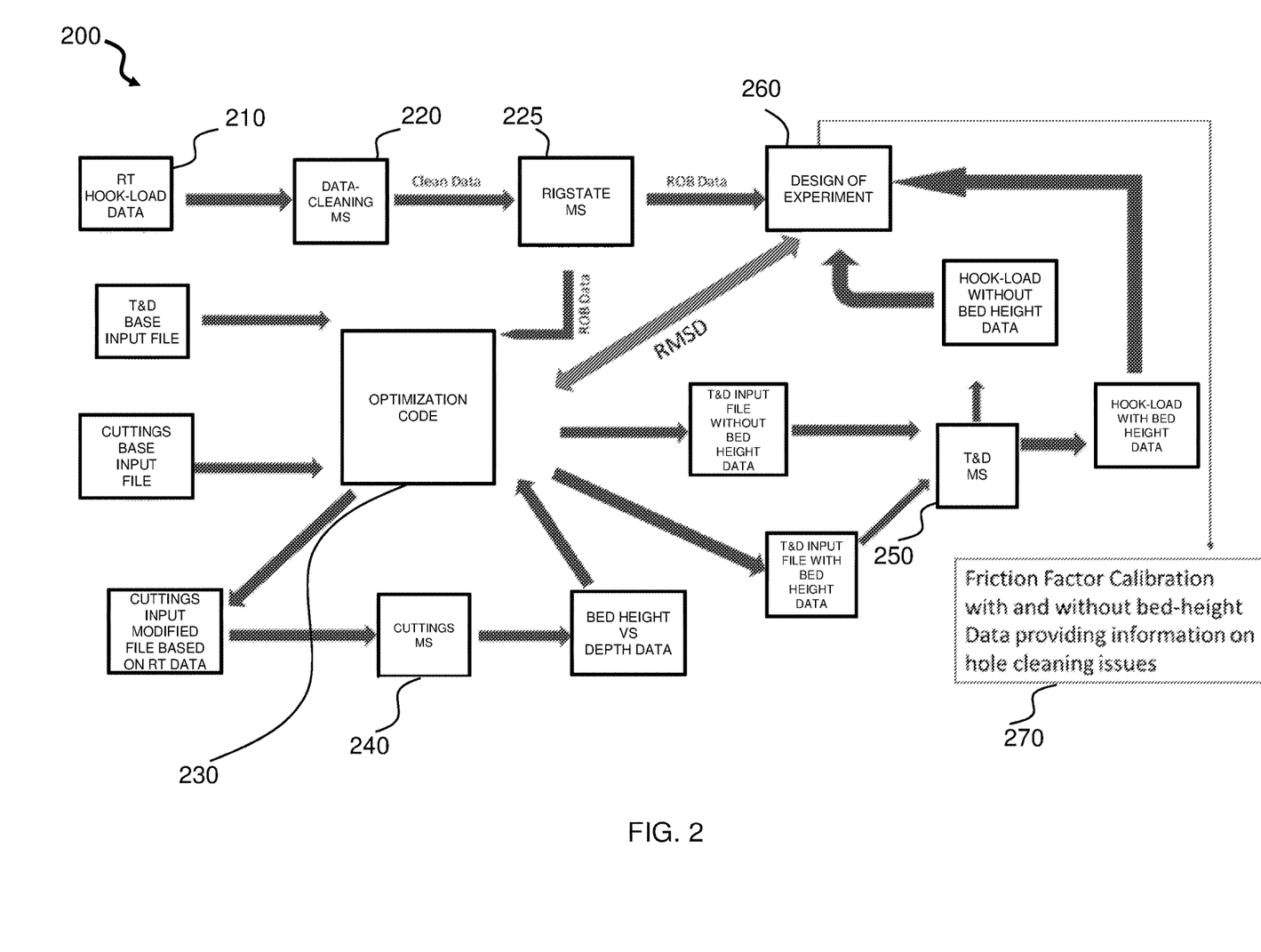
FIG. 2 is an illustration of a diagram of an example hole cleaning workflow.

FIG. 2 is an illustration of a diagram of an example hole cleaning optimization workflow 200 which is an example workflow to demonstrate the use of micro-services. One or more borehole operations can be implemented using micro-services and optimization workflows. As drilling operations progress, cuttings can settle around the drill string causing an increase in friction with the rotating drill string. Optimizing when and how to clean the hole can improve the overall efficiency of the drilling borehole operation. Predicting effects of inefficient and poor hole cleaning on hook-load for various rig operations such as tripping-in, tripping-out, rotating on bottom, or rotating off bottom in real-time or near real-time can be beneficial for the borehole operation.

A few of the micro-services are highlighted here for explanatory purposes. Hook-load data 210, such as real-time or near real-time hook-load data, can be communicated to a micro-service, such as a data cleaning micro-service 220. In some aspects, hook-load data 210 can be a real-time or near real-time stream of serialized drilling data that includes one or more of a hook-load data, weight on bit, bit depth, hole depth, pump flow rate, rate of penetration, and other borehole operation data. Hook-load data 210 is shown by example as a comma separate value (CSV) file, and in some aspects, can be a data stream, a file of various types, a database, a data store, or other forms of storing and transmitting data. Hole cleaning optimization workflow 200 shows, by example, several JavaScript object notation (json) components. In other aspects, other data interchange formats can be utilized, or various combinations of json and other data interchange formats can be utilized.

Data cleaning micro-service 220 and a rig-state micro-service 225 are shown by example as a python script, and in other aspects, can be one or more of various scripts, languages, implementations, or various combinations thereof. An optimization micro-service 230 can be one or more micro-services or software components to handle serializing the data, modifying files, calculating root mean square differences, determining deviation thresholds and outlier portions, and other optimization tasks and algorithms. An outlier portion is a portion of the sensor data that does not satisfy the specified deviation threshold. This can indicate that a calibration or correction may be needed on the factor being analyzed.

A cuttings micro-service 240 can perform operations such as analyzing the hole cleaning operation. A torque and drag micro-service 250 can determine the torque, hook-load, and other torque and load components of an overall drag friction factor, as well as apply a hole cleaning function to modify the torque, hook-load, and other factors, such as drag and friction factors.

The data can be communicated to a design of experiment micro-service 260, such as an operation optimizer, to further optimize the friction factors to improve the prediction of hook-load with the hole cleaning operation and without the hole cleaning operation to improve the estimation whether the borehole has been cleaned efficiently during the drilling operation. Design of experiment micro-service 260 is one type of optimizer that can be implemented. In other aspects, design of experiment micro-service 260 can be replaced or be used in conjunction with one or more other types of optimizers. The output of design of experiment micro-service 260, an output 270, can be used by a system, such as a well site controller, computing system, or drilling system to determine a friction factor calibration utilizing one or more differing scenarios where the calibrated friction factor can be utilized to adjust the borehole operations.

Figure 3:
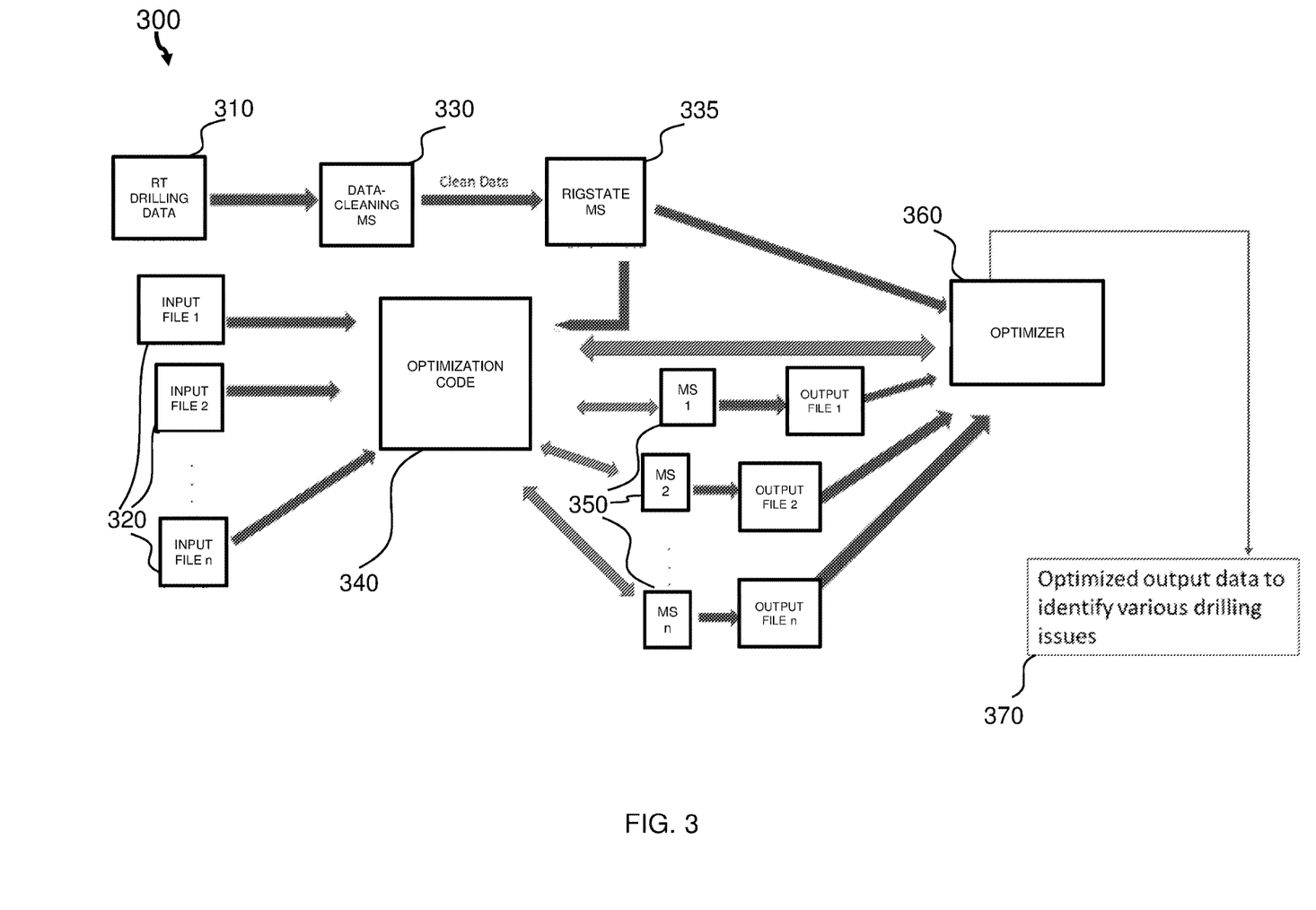
FIG. 3 is an illustration of a diagram of an example borehole optimization workflow.

FIG. 3 is an illustration of a diagram of an example borehole optimization workflow 300 which is a generalized optimization workflow utilizing micro-services building on FIG. 2. One or more borehole operations can be implemented using micro-services and optimization workflows. As drilling operations progress, various factors can affect the borehole operations, such as friction, and friction can be decomposed into one or more friction factors and other drilling factors where each factor can be analyzed using its own micro-service. In other aspects, one micro-service can analyze or process more than one factor. By optimizing one or more borehole factors can improve the overall efficiency of the drilling borehole operation.

Borehole optimization workflow 300 has real-time or near real-time data 310 being received, such as from sensors downhole, uphole, or at a surface location. In some aspects, inputs 320 can be input parameters to control how data 310 is process, analyzed, and optimized. In some aspects, inputs 320 can be sensor data previously collected, such as from a data store, database, memory, hard disk, or other storage location. In some aspects, inputs 320 can be a combination of input parameters and sensor data.

Data 310 can be communicated to a data cleaning micro-service 330 and then to a rig-state micro-service 335. Once data 310 has been processed, it can be combined with inputs 320 at an optimization micro-service 340 where data 310 can be, for example, serialized, have a root mean square difference, or other deviation algorithm applied to determine whether a deviation threshold has been met, and to perform other functions. Other micro-services 350 can receive and communicate parameters and data with the other micro-services, for example, to pre-process data 310, to post-process data 310, to analyze, manipulate, or calculate parameters for use by other micro-services. Other micro-services 350 can vary depending on the borehole operation being analyzed. A system optimizer 360 can receive the appropriate output from rig-state micro-service 335, optimization micro-service 340, and other micro-services 350 to generate an optimized output 370 that can be utilized by other borehole systems, for example, a well site controller, a drilling system, a bottom hole assembly, a computing system, and other borehole systems. Output 370 can be a calibration of an estimated borehole factor, an adjustment to a borehole operation, or other output data.

Data 310 is shown by example as a CSV file, and in some aspects, can be a data stream, a file of various types, a database, a data store, or other forms of storing and transmitting data. Inputs 320 are shown by example as json components. In other aspects, other data interchange formats can be utilized, or various combinations of json and other data interchange formats can be utilized.

Data cleaning micro-service 330 and a rig-state micro-service 335 are shown by example as python scripts, and in other aspects, can be one or more of various scripts, languages, implementations, or various combinations thereof. Optimization micro-service 340 can be one or more micro-services or software components to handle serializing the data, modifying files, calculating deviations, such as root mean square differences, determining deviation thresholds and outlier portions, and other optimization tasks and algorithms.

Figure 4:
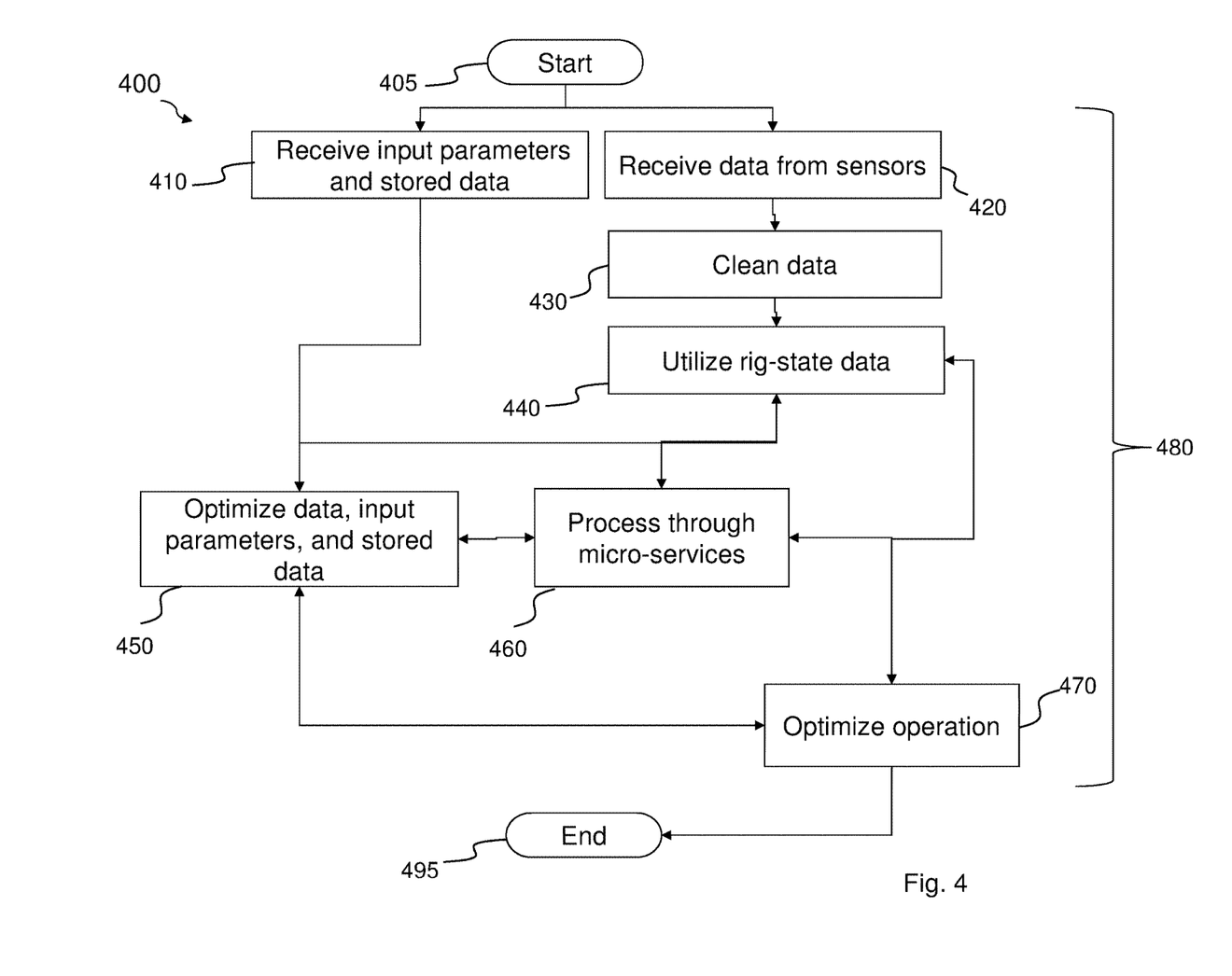
FIG. 4 is an illustration of a flow diagram of an example method for micro-service processing.

FIG. 4 is an illustration of a flow diagram of an example method 400 for micro-service processing. Method 400 can be performed on a computing system, such as a well site controller, a geo-steering system, a BHA, a downhole tool, a surface tool, or other computing system capable of receiving the various survey parameters and inputs, and capable of communicating with equipment or a user at a borehole site. Other computing systems can be a smartphone, PDA, laptop computer, desktop computer, server, data center, cloud environment, or other computing system. Method 400 can be encapsulated in software code or in hardware, for example, an application, code library, dynamic link library, module, function, RAM, ROM, and other software and hardware implementations. The software can be stored in a file, database, or other computing system storage mechanism. Method 400 can be partially implemented in software and partially in hardware. Method 400 can perform the operations within the computing system or, in some aspects, generate a visual component, for example, a chart or graph showing the received data, calibration information, and optimized output data, and other parameters, for example, a weighted distribution curve or deviation threshold.

Method 400 starts at a step 405 and proceeds to a first set of micro-services shown by example by step 410 and a step 420. In step 410, input parameters can be received, where the input parameters can be pre-existing factors, previous survey data, factors from a data source, and other input parameters, for example, a weight distribution model, a type of borehole operation, a distance interval (such as at 40 foot intervals) for performing the method, and other input parameters. The data source can be one or more various data sources, such as a well site controller, a server, laptop, PDA, desktop computer, database, file store, cloud storage, data center, or other types of data stores, and be a downhole location, a borehole surface location, proximate the borehole, a distance from the borehole, in a lab, an office location, a data center, or a cloud environment.

In step 420, data can be received, where the data can be factors or parameters derived from real-time or near real-time measurements collected from sensors at a downhole, an uphole, or a surface location, and other data, for example, a type of borehole operation, a distance interval for performing the method, and other data. The data can be collected at each survey station, or at a determined interval when using continuous survey operations.

Proceeding from step 420, is a step 430 where the received data is cleaned and adjusted for the borehole operation being analyzed. Cleaning the data prior to use by one or more micro-services can be done by applying one or more statistical algorithms to the data, for example, a signal-to-noise algorithm. In a step 440, rig-state data can be combined with the received data. The output of step 440 is generated processed data, such as a combination of the received data of survey measurements and data received from the rig, e.g., derrick and other borehole tools and systems, for example, the measured hook-load, the fluid composition being pumped downhole, the rotational speed of the drill string, and other rig-state data.

Proceeding from step 410 or step 440, a second set of micro-services are executed, as shown by example by a step 450 and a step 460. Step 450 and step 460 can be performed in various orders, combinations, and performed one or more times during the optimization workflow. Step 450 is one or more micro-services that can optimize the data, the input parameters, stored data, rig-state data, and other data elements, as received or as further processed by other micro-services, such as micro-services in step 460. Optimizing the data can be by serializing the data, modifying the optimization workflow, and calculating deviations of the data from an estimated calibration factor. Step 460 can be one or more micro-services to perform operations for the optimization workflow. Step 460 micro-services can be of more than one type, such as hole cleaning micro-services, decomposed friction factor micro-services, or calibration micro-services.

The output from step 450 and step 460 can be communicated to step 470 where an optimization workflow optimizer performs remaining calibration steps and other optimizations to one or more selected borehole operations. The output from step 470, e.g., generated optimization factors, can be communicated to a borehole system, such as a borehole operation planner, a well site controller, a drilling system, a BHA, or other borehole systems to allow adjustments to be made to the borehole operations to improve the efficiency of those borehole operations. Method 400 ends at a step 495.

In some aspects, step 410, step 420, step 430, step 440, step 450, step 460, and step 470 (collectively, steps 480) can be various combinations of data interchanges, micro-services, and other computing processes. In some aspects, steps 480 can be performed on one or more computing systems, for example, a first set of the steps of steps 480 can be performed on a well site controller proximate the borehole, a second set of steps of steps 480 can be performed on an edge computing system, a third set of steps 480 can be performed at a downhole tool, or various combinations thereof. In some aspects, steps of steps 480 can be performed serially, in parallel, partially overlapping, or various combinations thereof. The micro-service steps selected for performing a particular optimization workflow can vary according to the borehole operation. For example, a trip out of a drill string can utilize a different set of micro-services than a drilling operation.

Figure 5:
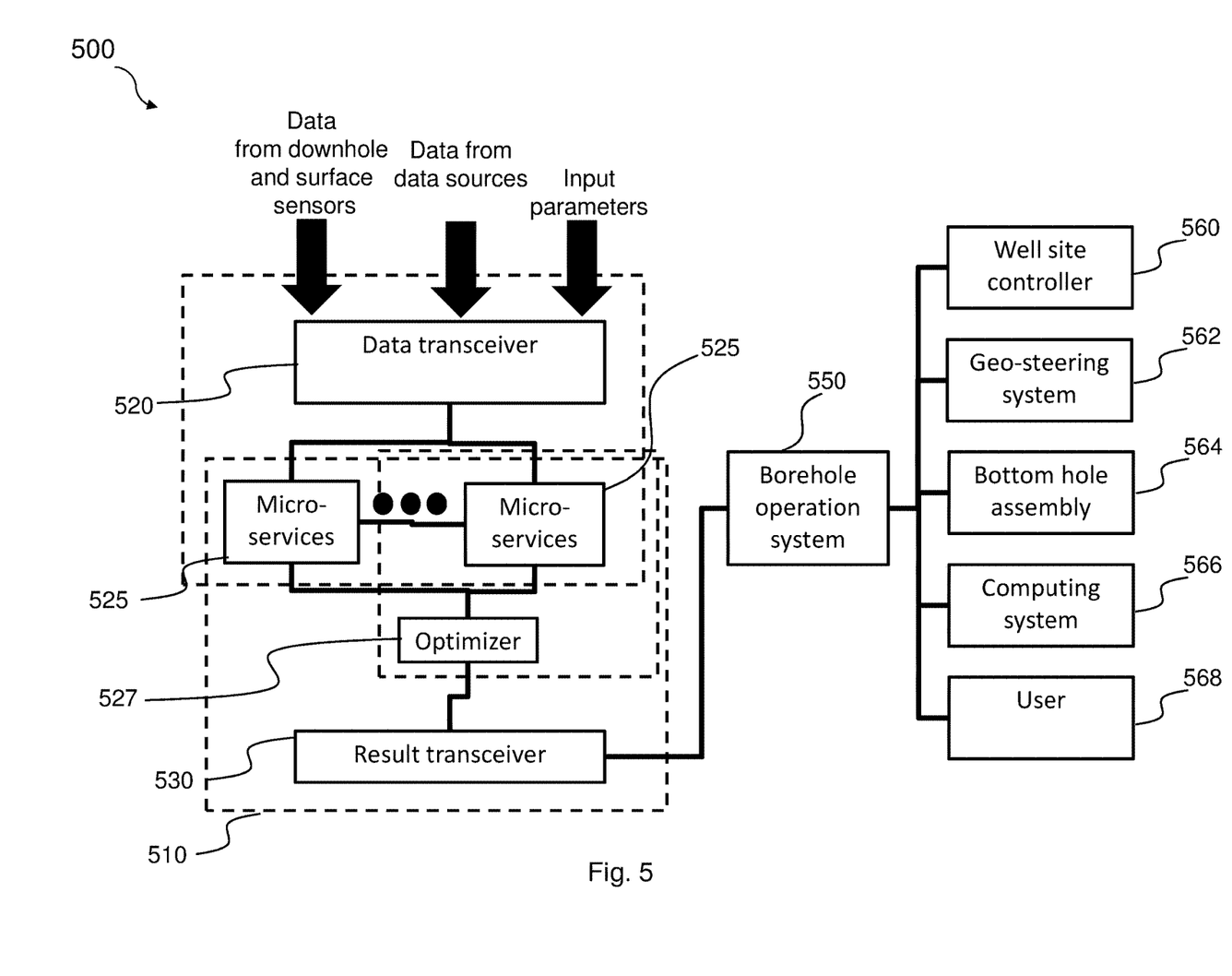
FIG. 5 is an illustration of a block diagram of an example micro-service system.

FIG. 5 is an illustration of a block diagram of a micro-service system 500, which can be implemented in one or more computing systems, for example, a well site controller, a reservoir controller, a drilling system, a BHA, a downhole tool, a data center, a cloud environment, a server, a laptop, a smartphone, a tablet, other computing systems, and various combinations thereof. The computing systems can be located downhole, proximate the well site, or a distance from the well site, such as in a data center, cloud environment, or corporate location. Micro-service system 500 can be implemented as an application, a code library, a dynamic link library, a function, a module, other software implementation, or combinations thereof. In some aspects, micro-service system 500 can be implemented in hardware, such as a ROM, a graphics processing unit, or other hardware implementation. In some aspects, micro-service system 500 can be implemented partially as a software application and partially as a hardware implementation.

Micro-service system 500 can have its components, a data transceiver 520, one or more micro-services 525, an optimizer 527, and a result transceiver 530, located in one or more computing systems as shown by example by overlapping dotted boxes 510. Data transceiver 520 can receive input parameters, real-time or near real-time data from sensors downhole, uphole, or at a surface location, data from previous survey data, and data from a data store. The downhole sensors, the uphole sensors, and the surface sensors can collect measurements of a borehole or borehole systems located in or proximate the borehole, such as fluid composition, temperature, subterranean formation mineralogy, rig-state, derrick parameters, and other borehole and borehole system data. Data transceiver 520 is capable of receiving data for one or more portions of the borehole.

The input parameters can be parameters, instructions, directions, data, and other information to enable or direct the remaining processing of micro-service system 500. For example, the input parameters can include a weight distribution model, a distance interval for performing the methods and processes, a type of borehole operation, data, an optimization workflow to perform, and other input parameters. The data store can be one or more data stores, such as a database, a data file, a memory, a server, a laptop, a server, a data center, a cloud environment, or other types of data stores located proximate data transceiver 520 or a distance from data transceiver 520.

Data transceiver 520 can receive the data and parameters from one or more sensors located proximate the drilling system or located elsewhere in the borehole or at a surface location. In some aspects, data transceiver 520 can receive various data from a computing system, for example, when a controller or computing system collects the data from the sensors and then communicates the data to data transceiver 520. The measurements collected by the sensors can be transformed into data processable by micro-services 525 by the sensors, data transceiver 520, or another computing system.

Result transceiver 530 can communicate one or more calculated results, e.g., result parameters, optimized output data, or friction factor calibrations and optimizations, to one or more other systems, such as a geo-steering system, a geo-steering controller, a well site controller, a computing system, a BHA, drilling system, a user, or other borehole related systems. Other borehole related systems can include a computing system where micro-services 525 are executing or be located in another computing system proximate or a distance from micro-services 525. Data transceiver 520 and result transceiver 530 can be, or can include, conventional interfaces configured for transmitting and receiving data, for example, using a json data interface. In some aspects, data transceiver 520 and result transceiver 530 can be combined into one transceiver. In some aspects, data transceiver 520, micro-services 525, and result transceiver 530 can be combined into one component.

Micro-services 525 can implement the methods, processes, analysis, and algorithms as described herein utilizing the received data and input parameters to determine, in some aspects, an optimization for a borehole operation. In some aspects, micro-services 525 can determine a calibration of an estimated factor for a borehole operation. Micro-services 525 can use one or more algorithms, such as machine learning, decision tree, random forest, logistic regression, linear, stochastic, and other statistical algorithms. In some aspects, micro-services 525 can utilize a weight distribution model to ascertain whether a data element exceeds a deviation threshold along a portion of the distance interval. In some aspects, the weight distribution deviation threshold and the portion of the data element falling outside of the deviation threshold can be communicated as part of the results to other borehole systems.

Optimizer 527 can receive the output of micro-services 525. In some aspects, optimizer 527 can generate a calibration factor that can be applied to an estimated factor of a borehole operations, for example, a calibration factor for an estimated friction factor of a drilling operation. In some aspects, optimizer 527 can generate an adjustment recommendation for a borehole operation, for example, an adjustment to a fluid composition or a drill string rotational speed. A memory or data storage of micro-services 525 or optimizer 527 can be configured to store the processes and algorithms for directing the operation of micro-service system 500.

The results from result transceiver 530 can be communicated to another system, such as a borehole operation system 550. Borehole operation system 550 can be one or more of a well site controller 560, a geo-steering system 562, a BHA 564, a computing system 566, or a user 568. The results can be used to direct the borehole operation system 550 in improving the efficiency of the borehole operation, such as adjusting the borehole operation plan, calibrating input factors, and other adjustments.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:

A. A method, including (1) receiving initial data and input parameters, wherein at least a portion of the data is received from sensors and at least one sensor of the sensors is located downhole of a borehole, (2) processing the initial data through a first set of one or more micro-services utilizing the input parameters to generate processed data, and (3) generating one or more optimization factors utilizing the processed data for a borehole operation utilizing a second set of one or more micro-services, wherein the borehole operation is performed at least partially within the borehole.

B. A micro-service system, including (1) a data transceiver, capable of receiving input parameters and initial data from one or more of a downhole sensor, an uphole sensor, a surface sensor, a data store, previous survey data, a well site controller, or a computing system, wherein the downhole sensor, the uphole sensor, and the surface sensor collect measurements of a borehole or borehole system located in or proximate the borehole, (2) a result transceiver, capable of communicating one or more generated optimization factors to a borehole system, and (3) one or more micro-services, capable of utilizing the initial data and the input parameters to generate the one or more generated optimization factors.

C. A computer program product having a series of operating instructions stored on a non-transitory computer-readable medium that directs a data processing apparatus when executed thereby to perform operations, the operations including (1) receiving initial data and input parameters, wherein at least a portion of the data is received from sensors and at least one sensor of the sensors is located downhole of a borehole, (2) processing the initial data through a first set of one or more micro-services utilizing the input parameters to generate processed data, and (3) generating one or more optimization factors utilizing the processed data for a borehole operation utilizing a second set of one or more micro-services, wherein the borehole operation is performed at least partially within the borehole.

Each of aspects A, B, and C can have one or more of the following additional elements in combination. Element 1: communicating the one or more optimization factors to a system of the borehole. Element 2: adjusting a borehole operation plan of the borehole using the one or more optimization factors. Element 3: identifying an outlier portion of the one or more optimization factors using the input parameters, wherein the input parameters include a deviation threshold. Element 4: calibrating an estimated borehole operation factor using the one or more optimization factors. Element 5: cleaning the initial data prior to use by the second set of one or more micro-services by applying one or more statistical algorithms. Element 6: optimizing the initial data by serializing the initial data, modifying an optimization workflow of the second set of one or more micro-services, and calculating deviations of the initial data from an estimated calibration factor. Element 7: wherein the initial data includes information received for a rig-state. Element 8: wherein the one or more optimization factors is a calibration of an estimated calibration factor of the borehole operation. Element 9: wherein the one or more optimization factors is an adjustment to the borehole operation. Element 10: wherein the initial data is received from one or more of a downhole sensor, an uphole sensor, a surface sensor, a data store, a well site controller, or a computing system. Element 11: wherein the method is performed for two or more borehole operations as determined by the input parameters. Element 12: wherein the borehole system is capable of adjusting a borehole operation plan. Element 13: wherein the borehole system is one or more of a well site controller, a geo-steering system, a bottom hole assembly, or a computing system. Element 14: wherein the one or more generated optimization factors are one or more of a calibration of a borehole operation factor or an adjustment of a borehole operation. Element 15: wherein the one or more micro-services are executed on one or more computing systems. Element 16: wherein the one or more computing systems are located at one or more locations, and the one or more locations are one or more of a downhole location, a borehole surface location, a cloud environment, a data center, an edge computing system, or an office location.

What is claimed is:

1. A method, comprising:
    receiving initial data and input parameters, wherein at least a portion of the initial data is sensor data received from sensors and at least one of the sensors is located downhole in a borehole, wherein the sensor data is related to different factors affecting a borehole operation associated with the borehole;
    independently analyzing the different factors utilizing a first set of one or more micro-service processors and the input parameters;
    optimizing one or more of the different factors utilizing a second set of one or more micro-services processors and the independent analysis of the different factors; and
    adjusting the borehole operation using the one or more of the different optimized factors.

2. The method as recited in claim 1, wherein the independently analyzing includes identifying an outlier portion of the different factors using the input parameters, wherein the input parameters include a deviation threshold for each of the different factors.

3. The method as recited in claim 2, wherein the adjusting includes
    calibrating an estimated borehole operation factor using the one or more of the different optimized factors.

4. The method as recited in claim 1, further comprising cleaning the initial data prior to the optimizing by applying one or more statistical algorithms.

5. The method as recited in claim 1, further comprising optimizing the initial data by serializing the initial data, modifying an optimization workflow of the second set of one or more micro-service processors, and calculating deviations of the initial data from an estimated calibration factor.

6. The method as recited in claim 1, wherein the initial data includes information received for a rig-state.

7. The method as recited in claim 1, wherein the one or more of the different optimized factors is a calibration of an estimated calibration factor of the borehole operation.

8. The method as recited in claim 1, wherein the one or more of the different optimized factors is an adjustment to the borehole operation.

9. The method as recited in claim 1, wherein the sensor data is received from one or more of a downhole sensor, an uphole sensor, or a surface sensor.

10. The method as recited in claim 1, wherein the method is performed for two or more borehole operations as determined by the input parameters.

11. A micro-service system, comprising:
a data transceiver, capable of receiving input parameters and initial data, wherein at least a portion of the initial data is sensor data received from sensors and at least one of the sensors is located downhole in a borehole, wherein the sensor data is measurements related to different factors affecting a borehole operation associated with the borehole; and
one or more micro-services processors, capable of independently analyzing the different factors utilizing the input parameters, optimizing one or more of the different factors utilizing the independent analysis of the different factors; and adjusting the borehole operation using the one or more of the different optimized factors.

12. The micro-service system as recited in claim 11, wherein the borehole system adjusts the borehole operation using the one or more of the different optimized factors.

13. The micro-service system as recited in claim 11, wherein the borehole system is one or more of a well site controller, a geo-steering system, a bottom hole assembly, or a computing system.

14. The micro-service system as recited in claim 11, wherein the one or more of the different optimized factors are a calibration of a borehole operation factor.

15. The micro-service system as recited in claim 11, wherein the one or more micro-services processors are on one or more computing systems.

16. The micro-service system as recited in claim 15, wherein the one or more computing systems are located at one or more locations, and the one or more locations are one or more of a downhole location, a borehole surface location, a cloud environment, a data center, an edge computing system, or an office location.

17. A computer program product having a series of operating instructions stored on a non-transitory computer-readable medium that directs a data processing apparatus when executed thereby to perform operations, the operations comprising:
receiving initial data and input parameters, wherein at least a portion of the initial data is sensor data received from sensors and at least one of the sensors is located downhole in a borehole, wherein the sensor data is related to different factors affecting a borehole operation associated with the borehole;
independently analyzing the different factors utilizing a first set of one or more micro-service processors and the input parameters;
optimizing one or more of the different factors utilizing a second set of one or more micro-service processors and the independent analysis of the different factors; and
adjusting the borehole operation using the one or more of the different optimized factors.

18. The computer program product as recited in claim 17, wherein the independently analyzing includes identifying an outlier portion of the different factors using the input parameters, wherein the input parameters include a deviation threshold for each of the different factors.

19. The computer program product as recited in claim 18, wherein the adjusting includes
calibrating an estimated borehole operation factor using the one or more of the different optimized factors.

20. The computer program product as recited in claim 17, wherein the operations further include:
cleaning the initial data by applying one or more statistical algorithms.

21. The computer program product as recited in claim 17, wherein the operations further include:
optimizing the initial data by serializing the initial data and calculating deviations of the initial data from an estimated calibration factor.

* * * * *